(12) United States Patent  (10) Patent No.: US 8,037,455 B2
Eckardt et al.  (45) Date of Patent: Oct. 11, 2011

(54) METHOD AND DEVICE FOR THE AUTOMATED EVALUATION OF SOFTWARE SOURCE CODE QUALITY

(75) Inventors: Horst Eckardt, München (DE); Andreas Henning, München (DE); Christian Körner, Bergen (DE)

(73) Assignee: Siemens Aktiengesellschaft, Munich (DE)

( * ) Notice: Subject to any disclaimer, the term of this patent is extended or adjusted under 35 U.S.C. 154(b) by 1435 days.

(21) Appl. No.: 11/512,177

(22) Filed: Aug. 30, 2006

(65) Prior Publication Data

US 2007/0055959 A1    Mar. 8, 2007

(30) Foreign Application Priority Data

Sep. 5, 2005 (DE) .......................... 10 2005 042 129

(51) Int. Cl.
 *G06F 9/45* (2006.01)

(52) U.S. Cl. ....................................................... 717/126

(58) Field of Classification Search .................... 717/126
See application file for complete search history.

(56) References Cited

U.S. PATENT DOCUMENTS

| 7,669,180 B2* | 2/2010 | Bassin et al. | 717/101 |
| 7,788,632 B2* | 8/2010 | Kuester et al. | 717/100 |
| 7,840,944 B2* | 11/2010 | Brunswig et al. | 717/124 |
| 2007/0006161 A1* | 1/2007 | Kuester et al. | 717/126 |
| 2007/0083859 A1* | 4/2007 | Fussell et al. | 717/168 |

OTHER PUBLICATIONS

Yu, Yinjun et al.: "Software refactoring guided by multiple soft-goals". In: The First International Workshop of Refactoring, Nov. 13, 2003, British Columbia, Canada. http//www.cs.toronto.edu/yinjun/GoalOrientedRefactoring.html.
ISO/IEC 9126-1—Software Engineering—Product Quality—Part 1: Quality Model, 2001.
Martin Fowler: Refactoring Improving the Design of Existing Code, Addison-Wessley, Jun. 1999, pp. 110-118 and pp. 142-145.

* cited by examiner

*Primary Examiner* — John Chavis

(74) *Attorney, Agent, or Firm* — Harness, Dickey & Pierce, P.L.C.

(57) ABSTRACT

A method and a device are disclosed for automated evaluation of the quality of a software source code, a quality target being predetermined for the quality of the source code. The current quality of the source code and the distance between the current quality of the source code and the predetermined quality target are determined for the quality of the source code. At least one embodiment of the invention permits high volumes of source code to be evaluated in an automated fashion with respect to their quality.

20 Claims, 1 Drawing Sheet

METHOD AND DEVICE FOR THE AUTOMATED EVALUATION OF SOFTWARE SOURCE CODE QUALITY

PRIORITY STATEMENT

The present application hereby claims priority under 35 U.S.C. §119 on German patent application number DE 10 2005 042 129.6 filed Sep. 5, 2005, the entire contents of which is hereby incorporated herein by reference.

FIELD

The invention generally relates to a method and/or a device for automated evaluation of the quality of a software source code.

BACKGROUND

When developing software, that is, programs for computers, improving the quality of the software code is an ongoing objective. This applies not only in relation to ensuring the functionality of the software, but also for example in relation to its maintainability and intelligibility. In particular it is difficult to achieve a sufficiently high software quality when the software is extensive, that is, there is a large volume of source code, particularly in order to cover the desired functionality. Moreover there is often a large number of explicit and implicit informal requirements, not all of which are known to the participating developers in the same degree, and are therefore not taken sufficiently into consideration in the course of development. Furthermore there is frequently intense time pressure for completion and delivery of the software.

Quality models for assessing the quality of software have already been developed, enabling quality to be assessed according to predetermined criteria. Such a quality model is contained in for example the German industrial standard, DIN, ISO 9126, Software engineering—software product evaluation, product quality and guide to quality in use, 1991. This standard defines metrics to be used in measuring and specifying software quality. Going beyond this standard, the following list gives some examples of object-oriented metrics: Depth of inheritance tree, DIT, number of children, NOC, coupling between objects, CBO, weighted methods per class, WMC, response for class, RFC, message passing coupling, MPC, lack of cohesion in methods, LCOM, etc. These metrics can be used to measure properties of object-oriented software at the level of classes and methods.

Metrics are indicators of errors contained in the software and in many cases are meaningful to only a limited extent. They are very strongly dependent on the technological boundary conditions of the computer systems used, such as memory capacity, reaction time, throughput, restart capability following a halt, update capabilities, etc. It is therefore also necessary to have the quality of the software assessed by experts who personally read through at least some parts of the source code in a more or less structured manner. In this way potential sources of error are pinpointed, documented and ways of improvement suggested, preferably leading to correction of the software error. However, due to rapidly growing volumes of source code, a high linkage between systems and their application environments, short development times, often locally distributed development capacity and last but not least a lack of experts, this procedure is increasingly impracticable and open to error.

So-called refactorings or refactoring steps are known from Martin Fowler, "Refactoring: Improving the Design of Existing Code", Addison-Wesley, New York, 1999. Refactoring steps are function-acquiring transformations of the source code which can lead to an improvement in the intelligibility of the source code. Examples of such refactoring steps include: Extract method, in order to extract a method (subroutine) from the code; inline method, in order to insert a method into the code; move method, in order to move a method from one class to another; move attribute, in order to move an attribute from one class to another; extract class, in order to generate a new class and move certain cohesive attributes and methods to this new class; inline class, in order to move the members of a class into another class and delete the old class, etc.

SUMMARY

At least one embodiment of the present invention enables the automated evaluation of software source code quality in a technically simple way.

In at least one embodiment of the method, the current quality of the source code, and the distance between the current quality of the source code and a predetermined quality target, are determined for the quality of the source code. In the device there is a determining device for determining the current quality of the source code, and a control device for determining the distance between the current quality of the source code and a predetermined quality target for the quality of the source code. The control device is designed so that in particular it enables the method to which the invention relates to be performed.

By determining said distance it is possible to determine a measure of the outlay required to obtain the desired source code quality defined by the quality target. The outlay can advantageously be specified on the basis of an assessment of predefined criteria for achieving the quality target, such as the time and/or money that will need to be expended. The distance from the quality target can be determined according to a scale. The scale can include in particular a nominal, ordinal, interval, ratio and/or absolute scale. Aspects that can be relevant both for specifying the quality target and for determining the current quality of the source code can include maintainability, complexity, reliability, usability, efficiency, portability, intelligibility, productivity, security and/or effectiveness of the source code.

According to an example development of the invention, a sequence of a plurality of so-called refactoring steps is determined by automated devices/methods, enabling the distance to be determined. Such a sequence includes in particular the sequential execution of individual refactoring steps. The refactoring steps are functionally equivalent to transforming the source code into a better state of source code. The assessment of the better state of source code is related in particular to a defined quality model. The defined sequence of refactoring steps moreover demonstrates advantageously a way in which the quality target can be achieved on the basis of the current quality state of the source code. At the same time it provides a proposal for improving the quality of the software.

Additionally developers or experts can introduce implicit requirements and informal supplementary conditions into their choices when defining the sequence, thereby contributing without difficulty to improving the quality of the source code. Advantageously, in at least one embodiment, it is thus possible in particular to improve high volumes of source code in an effective way by automated devices/methods. Using the sequence of refactoring steps to assess the distance also represents a proposal for using the sequence of refactoring steps to improve the source code by automated devices/methods. Likewise determining the distance as a measure of quality is comprehensible, objectifiable and reproducible, since the explanation based on proposals for improvement, that is, the sequence of refactoring steps, is specified.

According to a further advantageous embodiment of the invention a multiple plurality of sequences is determined, and a distance is determined for each plurality of sequences. Each plurality of sequences includes a plurality of refactoring steps. Once determined, the multiple plurality of sequences can be used to achieve the quality target by suitable means. At the very least these sequences make it possible to get reasonably close to the quality target. The plurality of sequences can advantageously be compiled having regard to a quality model and the quality target. This makes it possible to form a suitable basis for defining the sequence in a particularly effective way.

In particular, the defined sequence of refactoring steps is preferably selected from the determined plurality of possible sequences of refactoring steps. This selection is likewise advantageously made by automated devices/methods. This makes it possible to ensure that an optimized sequence of refactoring steps is selected, at the same time providing a particularly effective possibility of improving the quality of the source code. It is possible to combine the individual refactoring steps into a sequence in many different variants in order to obtain the optimum sequence.

In a further, example embodiment of the invention, a step distance for individual refactoring steps is determined as the distance between the current quality of the source code and the quality of the source code according to the quality target relating to the individual refactoring step. The sum of the step distances of the individual refactoring steps within the sequence defines a sequence distance for this sequence of refactoring steps. Given a plurality of sequence distances for a plurality of sequences, the most favorable of these sequence distances then advantageously corresponds to the distance between the current quality of the source code and the predetermined quality target for the source code quality. The complete source code does not need to be transformed in order to define the step distances. Instead it is enough to use the individual refactoring steps at a higher-ranking level on such parts of the software as are particularly relevant to defining one or more metrics. The quality metrics can likewise advantageously be defined by automated devices/methods.

According to a further, example development of the invention a quality model is predefined. The distance is then determined by reference to this predefined quality model. By this, the invention can be suitably adapted to different quality standards. Such a quality model can for example be derived from DIN standard ISO 9126. However, it is also possible to use other quality models.

BRIEF DESCRIPTION OF THE DRAWINGS

Further advantageous embodiments and developments of the invention may be inferred from the description by reference to the drawings.

The invention will be explained in greater detail below with the aid of the example embodiments shown in the diagrams within the drawings. These show the following.

DETAILED DESCRIPTION OF THE EXAMPLE EMBODIMENTS

Figure 1:
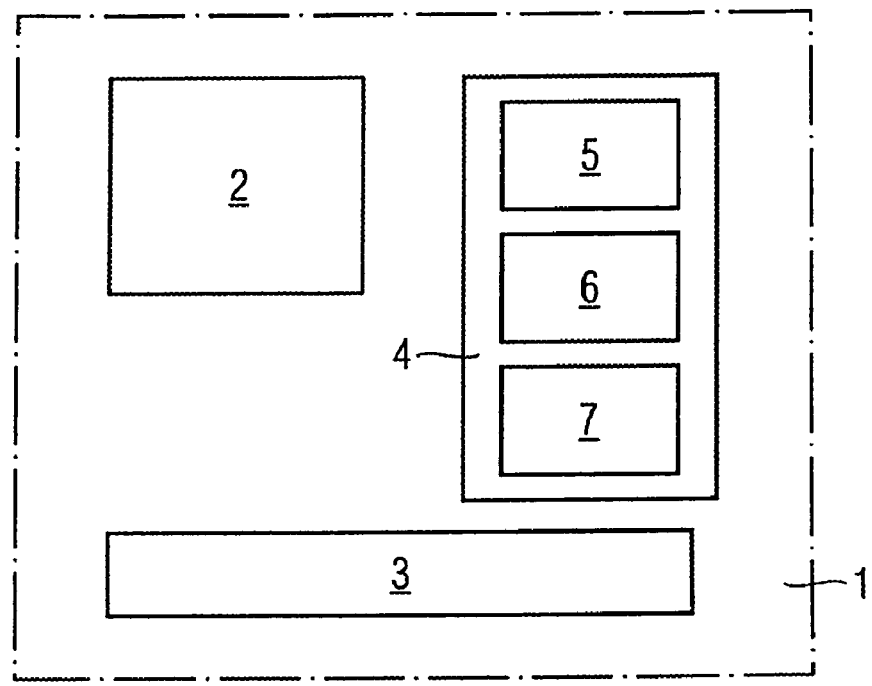
FIG. 1 A diagram showing an example embodiment of a device according to the invention for automated evaluation of the quality of a software source code.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described.

FIG. 1 includes a diagram showing an example embodiment of a device according to the invention for automated evaluation of the quality of a software source code. In this case said inventive device is a computer 1. The computer 1 has a screen 2 together with an input device which in this case is a keyboard 3. The computer 1 also includes a control device 4 having a plurality of components. Two of these components are a determining device 5 and a control device 6. The control device 4 contains in particular a processor and a memory in which is stored a suitable program, being a piece of software, the processor being capable of executing the program in order to perform the method to which an embodiment of the invention relates. The control device 4 further contains a software memory 7 in which is stored the software which is to have its quality evaluated. The computer 1 and in particular the embodiment of the control device 4 complete with its components 5 and 6 can be used to perform at least one embodiment of the inventive method for evaluating the quality of the software source code by automated devices/methods. This will now be described with the aid of FIG. 2.

Figure 2:
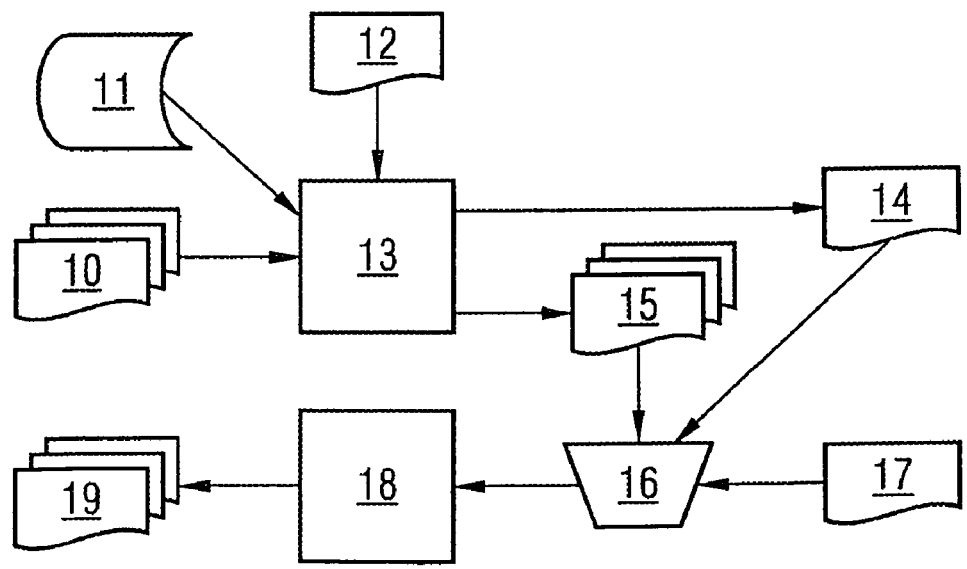
FIG. 2 A diagram showing an example embodiment of a method according to the invention for automated evaluation of the quality of a software source code.

FIG. 2 includes a diagram showing an example embodiment of the method according to an embodiment of the invention for evaluating the quality of a software source code by automated devices/methods. This software source code is stored in the memory 7 of the computer 1. The software that controls the flow of an embodiment of the inventive method is contained in the control device 4. The starting points for executing the method are the source code requiring evaluation and improvement, represented in FIG. 2 by the method component with the reference number 10. A method component 11 represents a plurality of individual refactoring steps which can be used for evaluating the source code. A method component 12 represents a predetermined quality target specifying a desired quality which the software must have. The quality target is based on a predetermined quality model. The method components 10, 11 and 12 represent predefined conditions for performing the inventive method.

At least one metric giving in particular a guide to the current quality of the software source code is computed in a method step 13 by way of the predefined conditions, source code, refactoring steps and quality target. This is the basis for allocating individual distances, that is, step distances, to the individual refactoring steps in a method step 14. The step distances represent measures of distance between the current source code quality and the desired source code quality defined by the quality target by reference to the respective individual refactoring steps. Computation of the at least one metric in the method step 13 is likewise the basis for compiling various sequences of refactoring steps in a method step 15.

In a method step 16 a suitable sequence of refactoring steps is selected by way of the step distances from the individual refactoring steps allocated in the method step 14 and the sequences of refactoring steps compiled in the method step 15. Here the respective step distances of the individual refactoring steps compiled into one of the sequences are totaled up into sequence distances for the respective sequences and compared with one another. The most favorable sequence is then selected. The sequence distance of this selected sequence corresponds to the distance between the current source code quality and the quality target predetermined for the source code quality.

In a method component 17, an expert or developer who wrote and/or is reviewing the source code has the option to influence the choice of refactoring steps sequence manually. In particular the expert or developer can take account of implicit requirements and informal supplementary conditions. In a method step 18 the selected sequence of refactoring steps is applied to the source code in a refactoring editor. The refactoring editor can be for example a program known as Eclipse. The result is a source code purged of errors which has been improved in quality according to the quality model chosen in respect of the source code as it exists according to the method component 10. The error-free source code is represented in FIG. 2 by a method component 19.

According to an embodiment of the invention, it is advantageously possible to carry out an evaluation of the current software source code quality as it exists according to the method component 10. This is carried out with the aid of the sequence of refactoring steps as chosen in the method step 16. At the same time this sequence serves to bring about a direct, automated improvement in the source code quality, since the sequence can be applied directly to the source code.

According to the example embodiment in FIG. 1, the control device 4 of the computer 1 is designed in such a way that the determining device 5 serves to determine the current source code quality. In particular, therefore, the method step 13 is executed in the determining device 5. The control device 6 serves to determine the distance between the current source code quality and the quality target predetermined for the source code quality. In particular, therefore, the method step 18 is executed in the control device 6. The control device 6 is furthermore used to select and define the refactoring steps sequence by automated devices/methods, from the plurality of possible refactoring step sequences predetermined in the method step 15. Moreover the control device 6 determines the respective step distance for the individual refactoring steps, with the sum of the step distances of the individual refactoring steps within one of the sequences defining the sequence distance for this sequence. In this respect the method steps 14, 15 and 16 are likewise performed with the aid of the control device 6.

Although the present invention has been described above by way of example embodiments, it is not limited to these and can be modified in various ways.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for automated evaluation of quality of a software source code, a quality target being predetermined for the quality of the source code, the method comprising:
   determining a current quality for the source code; and
   determining a distance between the current quality of the source code and the quality target.

2. The method as claimed in claim 1, wherein, in an automated fashion, a sequence of a plurality of refactoring steps is defined and the distance is determined by way of the defined sequence of refactoring steps.

3. The method as claimed in claim 2, wherein a multiple plurality of sequences is determined and a distance is determined for each plurality of sequences, with each plurality of sequences including a plurality of refactoring steps.

4. The method as claimed in claim 2, wherein a step distance for individual refactoring steps is determined as the distance between the current quality of the source code and the quality of the source code according to the quality target relating to the individual refactoring step and the sum of the step distances of individual refactoring steps within the sequence defines a sequence distance for this sequence of refactoring steps.

5. The method as claimed in claim 3, wherein a step distance for individual refactoring steps is determined as the distance between the current quality of the source code and the quality of the source code according to the quality target relating to the individual refactoring step and the sum of the step distances of individual refactoring steps within the sequence defines a sequence distance for this sequence of refactoring steps.

6. The method as claimed in claim 3, wherein the defined sequence of refactoring steps is selected from the determined plurality of sequences of refactoring steps.

7. The method as claimed in claim 6, wherein a step distance for individual refactoring steps is determined as the distance between the current quality of the source code and the quality of the source code according to the quality target relating to the individual refactoring step and the sum of the step distances of individual refactoring steps within the sequence defines a sequence distance for this sequence of refactoring steps.

8. The method as claimed in claim 6, further comprising:
automatically evaluating the quality of the software source code based upon the determined distance between the current quality of the source code and the quality target.

9. The method as claimed in claim 1, wherein a quality model is predetermined and the distance is determined by reference to this predetermined quality model.

10. A device for automated evaluation of quality of a software source code, a quality target being predetermined for the quality of the source code, the device comprising:
determining means for determining a current quality for the source code; and
control means for determining a distance between the current source code quality and the quality target.

11. The device as claimed in claim 10, wherein the control means is designed so that, in an automated fashion, a sequence of a plurality of refactoring steps is definable and the distance is determinable by way of the defined sequence of refactoring steps.

12. The device as claimed in claim 11, wherein the control means is further designed so that a step distance for individual refactoring steps is determinable as the distance between the current quality of the source code and the quality of the source code according to the quality target relating to the individual refactoring step, with the sum of the step distances of individual refactoring steps within the sequence defining a sequence distance for this sequence of refactoring steps.

13. Device as claimed in claim 11, wherein the control means is further designed so that it determines a multiple plurality of sequences and a distance for each plurality of sequences, with each plurality of sequences including a plurality of refactoring steps.

14. The device as claimed in claim 11, wherein a quality model is predetermined and the control means is designed so that the distance is determinable by reference to this predetermined quality model.

15. The device as claimed in claim 13, wherein the control means is further designed so that a step distance for individual refactoring steps is determinable as the distance between the current quality of the source code and the quality of the source code according to the quality target relating to the individual refactoring step, with the sum of the step distances of individual refactoring steps within the sequence defining a sequence distance for this sequence of refactoring steps.

16. The device as claimed in claim 13, wherein the control means is further designed so that the defined sequence of refactoring steps is selectable from the determined plurality of sequences of refactoring steps.

17. The device as claimed in claim 16, wherein the control means is further designed so that a step distance for individual refactoring steps is determinable as the distance between the current quality of the source code and the quality of the source code according to the quality target relating to the individual refactoring step, with the sum of the step distances of individual refactoring steps within the sequence defining a sequence distance for this sequence of refactoring steps.

18. The device as claimed in claim 13, wherein a quality model is predetermined and the control means is designed so that the distance is determinable by reference to this predetermined quality model.

19. The device as claimed in claim 10, wherein a quality model is predetermined and the control means is designed so that the distance is determinable by reference to this predetermined quality model.

20. The device as claimed in claim 10, further comprising:
means for automatically evaluating the quality of the software source code based upon the determined distance between the current quality of the source code and the quality target.

* * * * *